Patented Sept. 20, 1938

2,130,869

UNITED STATES PATENT OFFICE 2,130,869

MANUFACTURE OF NONCAKING POWDER COMPOSITION

Louis Block and Max Metziger, Joliet, Ill., assignors to Blockson Chemical Co., Joliet, Ill., a corporation of Illinois No Drawing. Application August 7, 1935, Serial No. 35,103

15 Claims. (Cl. 87—5)

The present invention relates to mixtures of ingredients in powder form which tend to cake, and to the avoidance of caking. It has special reference to mixtures containing silica and trisodium phosphate.

There are on the market many compounds containing trisodium phosphate which is a mild alkali. These are used as cleaning compounds, and in order to give a scouring property to the compound, finely divided abrasives are often added. When silica is present, there is a tendency for the powder mixture to cake. The present invention is based upon ascertaining the causes of caking, and consists in the addition of one or more corrective agents to keep such a powder mixture in uncaked form.

It has been discovered that the caking is caused by a chemical reaction involving silica in the formation of sodium silicate. This is generically the name for various forms of chemical combinations which may originate from caustic soda and silica, of which there are both simple and complex species. The "water glass" of commerce is a familiar example of sodium silicate, and it exemplifies an adhesive quality of sodium silicate, which apparently functions in the powder mixture above mentioned, as a cement or adhesive, producing the caking. The formation of sodium silicate in the powder mixture is aided by the presence of water. Water or moisture may be absorbed by the mixture, or it may be provided by the water of crystallization contained in the trisodium phosphate crystals, for example $Na_3PO_4.12H_2O$. The caustic soda which is involved in the formation of sodium silicate may be an impurity in the mixture, for example, an inclusion in the trisodium phosphate crystals, or it may be provided by a hydrolysis of trisodium phosphate itself.

The primary object of the invention is to minimize or prevent the presence of sodium silicate, thus minimizing or preventing an adhesive or cementing action, and at the same time to form a different silicate which does not have a caking quality.

Another object of the invention is the use in the mixture of a well distributed aluminum compound which is reactive with the solubilized silica to form a non-caking aluminum-containing silicate.

Still another object of the invention is the addition of a corrective agent consisting of carrier particles containing only a carried portion of the active aluminum compound.

A particular object of the invention is the use of an active aluminum phosphate as the corrective agent.

Various other and ancillary objects and advantages of the invention will become apparent from the following description and explanation.

In the investigation of the caking of mixtures of trisodium phosphate and finely divided silica (about 60% passing a 400 mesh screen and about 90% passing a 200 mesh screen) there was employed a standard method of analysis which determines soluble silica, or better soluble silicates, such as of sodium. Since the method involves use of water, there is bound to be found more such silicate than is actually present. This excess found by analysis will of course vary with the procedure and the character of the sample, for example, with the size of silica and the type of silica. The excess may be determined roughly in a "blank" analysis on a fresh mixture in which the caking reaction has not developed, the components of said blank mixture corresponding to the components of the mixture to be tested. Where blank samples may show that about .05% silica is soluble, a test sample showing about .25% soluble silica is one which is definitely caked.

In studying the effects of various corrective agents, test mixtures may be exposed to conditions which induce the caking reaction. One suitable way is to subject the samples for a definite period of time to definite humidity at definite temperature—then to a normal room temperature for a given period—and then to repeat the alternate exposures for a fixed number of times.

For example a mixture of 30% trisodium phosphate ($Na_3PO_4.12H_2O$) and 70% silica (of mesh given above) will cake in a fiber package when exposed alternately, four times to 105° F. and 60% humidity for 3-day periods, and alternately four times to room conditions for three-day periods. By use of a corrective agent according to this invention, the same samples can withstand such a test without caking.

It has been found that compounds containing aluminum can be used which provide aluminum for the formation of aluminum-containing silicate, the latter compound resulting from the reaction which otherwise leads to caking. Not all aluminum compounds are useful. They must be considered as active or inactive compounds, according as they function to minimize caking. Certain compounds chemically the same in empirical formula, may differ in physical form, yet in one form be active and in another be inactive.

Aluminum phosphate ($AlPO_4$) is one such compound. Its refractory and calcined forms are substantially inactive to prevent caking, while the dried precipitated and chemically prepared (uncalcined) forms, such as amorphous forms, are active for functioning according to the present invention. There seems to be no ready rule of measure, except experience, the test above described, and like arbitrary test. Therefore, where the term "active" is employed herein, it refers to those forms which may be used to carry out the present invention.

Aluminum hydrate ($Al_2O_3.xH_2O$) is another suitable active compound. This may be prepared by precipitating aluminum hydroxide in a well known manner and drying the same. One form is obtainable on the market as "light aluminum hydrate" used in printing inks, but such commercial material is an impure form, more accurately known as basic aluminum sulphate, having a small content of alum (aluminum sulphate) bound in a complex relation to the aluminum hydrate.

Alum itself is suitable for carrying out the ideas of the invention, but for practical purposes wherein the cakable mixture is used for its alkalinity, it is not desirable to use an alum or other alum complexes (such as sodium or potassium alum) which hydrolyze into a slightly acid form.

Organic aluminum compounds also may be active for the purposes of this invention. Aluminum acetate may be used, and other salts of organic acids, such as the aluminum soaps, for example aluminum stearate. For many reasons these are not preferred to others. The active aluminum phosphate is preferred, and although it is normally insoluble in water, yet its aluminum is available for reaction in the presence of alkali. Whenever soluble silicate is formed in the presence of alkali and aluminum phosphate, an aluminum-containing silicate results, rather than adhesive sodium silicate. The exact mechanism of the reaction is not known, but it is certain that the resulting aluminum-containing silicate is such that no caking takes place.

It is particularly to be noted that once the corrective agent is added to a mixture to minimize caking it is no longer possible by ordinary methods to determine soluble silica, or to determine aluminum-containing silicate. The success of the correcting agent is measurable, in a practical sense, only in terms of the quantity used and in terms of degree of caking or of non-caking.

The use of finely ground aluminum phosphate must be such that it is dispersed uniformly and widely throughout the mixture of silica and trisodium phosphate. It must be present everywhere in order absolutely to prevent the caking. Of course only its surface can be available for reaction, and its interior is inert. It is possible to use finely divided particles having a fractional content of the active correcting agent, the body of the particle being carrier, and the fractional content at the surface being available as a correcting agent. For example where aluminum phosphate is the desirable correcting agent, the particles may be residue of miscellaneous substances, preferably phosphates of metals such as calcium, iron and aluminum. From many processes of chemical operations in a plant treating phosphorus compounds, many complex residues are available with a fractional content of aluminum phosphate. One useful residue consisting largely of calcium, iron, and aluminum phosphates has about 14% to 15% of the latter. A 70-30 silica-trisodium phosphate mixture can be cured from caking by the presence of 4% of such residue containing about 15% aluminum phosphate. This amounts to about .6% of aluminum phosphate. This amount so applied gives a much better correction than the same quantity of finely divided 100% aluminum phosphate. It requires about 1% of the latter to secure as good results as with the 4% of impure material above referred to. 0.5% of 100% aluminum phosphate is hardly sufficient for practical elimination of caking in the 70-30 mixture described, but it gives substantial improvement.

The above details are all given with reference to the 70-30 mixture described, for the purpose of illustrating the invention. It is not possible to state the limits of the invention because an excess does no real harm, and because a minimum requirement will be determined by many factors. The character of and the fineness of both silica and of trisodium phosphate, the character of package, the conditions of exposure, all have a bearing on the extent to which the caking reaction may extend.

It should of course be understood that one tiny particle of the corrective agent has a limited sphere of influence in preventing caking. Therefore, in the aggregate, where a limited quantity of such agent is present, increased fineness will extend its total effect. Each particle within its sphere of influence or within its immediate vicinity, will prevent caking, and the aggregate effect will be minimizing the caking of the whole mixture. The extent to which "minimizing" will be "prevention" is of course to be determined by many factors, as will be obvious to one skilled in the art, from the description and explanation here given. For commercial usage mixtures can be made substantially non-caking in the aggregate.

Heretofore, the art has made the silica very fine, in order to minimize the grittiness and scratching. It has also made the crystals of the trisodium phosphate very coarse, because this minimized the caking. This coarseness made the material more slowly-soluble in use, and therefore less satisfactory. By reason of the present invention, both the trisodium phosphate and the silica may be more finely ground and hence the product be greatly improved without the danger of caking.

It is to be understood that trisodium phosphate is obtainable in varying degrees of solubility and with varying impurities. When its crystals are formed, they have a strong tendency to carry into the crystals, other chemicals associated with them in the liquor. Thus, some contain under 5% of sodium fluoride, sodium borate, sodium nitrate, or sodium hydroxide. One form containing about 4% of sodium fluoride, is not readily soluble. One containing caustic soda, a form commonly used for silica base cleaning mixtures, is very likely to form cake with great rapidity, and therefore the invention is particularly advantageous in permitting use of such material, and in permitting fine-grinding of it for the powder mixture.

Accordingly the invention contemplates various embodiments or compositions which contain any cakable mixture of trisodium phosphate, (and of course its less commonly used equivalent in the other alkali metals, potassium, lithium, etc.) silica, and an aluminum compound active with such a mixture to minimize the caking, as defined in the appended claims.

We claim:

1. The method of minimizing caking of a powdery physical mixture of particles of silica and of particles of trisodium phosphate which comprises thoroughly dispersing throughout the mixture a small quantity of an aluminum compound which is active to prevent in its immediate vicinity the formation of an adhesive substance causing caking, said adhesive being normally caused by interaction of silica and alkaline sodium compound derived from the particles of trisodium phosphate.

2. The method of minimizing caking of a powdery physical mixture of particles of silica and of particles of trisodium phosphate which comprises thoroughly dispersing throughout the mixture a small quantity of particles consisting substantially of an aluminum compound which is active to prevent in its immediate vicinity the formation of an adhesive substance causing caking, said adhesive substance being normally caused by interaction of silica and alkaline sodium compound derived from the particles of trisodium phosphate.

3. The method of minimizing caking of a powdery physical mixture of particles of silica and of particles of trisodium phosphate which comprises thoroughly dispersing throughout the mixture a small quantity of particles containing a fractional content of an aluminum compound which is active to prevent in its immediate vicinity the formation of an adhesive substance causing caking, said adhesive substance being normally caused by interaction of silica and alkaline sodium compound derived from the particles of trisodium phosphate.

4. The method of minimizing caking of a powdery physical mixture of particles of silica and of particles of trisodium phosphate which comprises thoroughly dispersing throughout the mixture a small quantity of particles of aluminum phosphate which is active to prevent in its immediate vicinity the formation of an adhesive substance causing caking, said adhesive substance being normally caused by interaction of silica and alkaline sodium compound derived from the particles of trisodium phosphate.

5. The method of minimizing caking of a powdery physical mixture of particles of silica and of particles of trisodium phosphate which comprises thoroughly dispersing throughout the mixture a small quantity of particles containing a fractional content of aluminum phosphate which is active to prevent in its immediate vicinity the formation of an adhesive substance causing caking, said adhesive substance being normally caused by interaction of silica and alkaline sodium compound derived from the particles of trisodium phosphate.

6. The method of minimizing caking of a powdery physical mixture of particles of silica and of particles of trisodium phosphate which include as an impurity of crystallization a small quantity of alkaline sodium compound, which comprises thoroughly dispersing throughout the mixture a small quantity of an aluminum compound which is active to prevent in its immediate vicinity the formation of an adhesive substance causing caking, said adhesive substance being normally caused by interaction of silica and alkaline sodium compound derived from the particles of trisodium phosphate.

7. The method of minimizing caking of a powdery physical mixture of particles of silica and of particles of trisodium phosphate which include as an impurity of crystallization a small quantity of alkaline sodium compound in the form of caustic soda, which comprises thoroughly dispersing throughout the mixture a small quantity of an aluminum compound which is active to prevent in its immediate vicinity the formation of an adhesive substance causing caking, said adhesive substance being normally caused by interaction of silica and alkaline sodium compound derived from the particles of trisodium phosphate.

8. The method of minimizing caking of a powdery physical mixture of particles of silica and of particles of normal phosphate salt of alkali metal which comprises thoroughly dispersing throughout the mixture a small quantity of an aluminum compound which is active to prevent in its immediate vicinity the formation of an adhesive substance causing caking, said adhesive substance being normally caused by interaction of silica and alkaline alkali-metal compound derived from the particles of said phosphate salt of alkali metal.

9. A substantially non-caking powdery mixture comprising as the essential ingredients particles of silica, particles of the normal alkali-metal phosphate salt, and a small quantity of aluminum compound which is active to prevent in its immediate vicinity the formation of an adhesive substance which is the cause of caking, said adhesive substance being normally formed by interaction between silica and alkaline compound derived from particles of the said phosphate salt.

10. A substantially non-caking powdery mixture comprising as the essential ingredients particles of silica, particles of trisodium phosphate, and a small quantity of an aluminum compound which is active to prevent in its immediate vicinity the formation of an adhesive substance which is the cause of caking, said adhesive substance being normally formed by interaction of silica and alkaline sodium compound derived from the particles of the trisodium phosphate.

11. A substantially non-caking powdery mixture comprising as the essential ingredients particles of silica, particles of trisodium phosphate, and particles of an aluminum compound which is active to prevent in its immediate vicinity the formation of an adhesive substance which is the cause of caking, said adhesive substance being normally formed by interaction of silica and alkaline sodium compound derived from the particles of the trisodium phosphate.

12. A substantially non-caking powdery mixture comprising as the essential ingredients particles of silica, particles of trisodium phosphate, and particles of aluminum phosphate which is active to prevent in its immediate vicinity the formation of an adhesive substance which is the cause of caking, said adhesive substance being normally formed by interaction of silica and alkaline sodium compound derived from the particles of the trisodium phosphate.

13. A substantially non-caking powdery mixture comprising as the essential ingredients particles of silica, particles of trisodium phosphate, and particles containing a fractional content of an aluminum compound which is active to prevent in its immediate vicinity the formation of an adhesive substance which is the cause of caking, said adhesive substance being normally formed by interaction of silica and alkaline sodium compound derived from the particles of the trisodium phosphate.

14. A substantially non-caking powdery mixture comprising as the essential ingredients particles of silica, particles of trisodium phosphate, and particles containing a fractional content of aluminum phosphate which is active to prevent in its immediate vicinity the formation of an adhesive substance which is the cause of caking, said adhesive substance being normally formed by interaction of silica and alkaline sodium compound derived from the particles of the trisodium phosphate.

15. A detergent composition consisting of a physical mixture of particles of silica, particles of trisodium phosphate crystals, and particles containing aluminum phosphate which is active to prevent the formation in its immediate vicinity of an adhesive substance which causes caking, said adhesive substance being formed in the absence of said aluminum phosphate by interaction between the particles of silica and the substance derived from the particles of trisodium phosphate.

LOUIS BLOCK.
MAX METZIGER.